United States Defensive Publication [19] (H) [11] T973,013

Ferrara et al. [43] Aug. 1, 1978

[54] COMBINED MICROWAVE OVEN AND REFRIGERATOR

[75] Inventors: Frank I. Ferrara, Newburgh, Ind.; Samuel J. Pearson, St. Joseph, Mich.

[73] Assignee: Whirlpool Corporation

[21] Appl. No.: 834,761

[22] Filed: Sep. 19, 1977

[51] Int. Cl.[2] ..... A47B 83/00

[52] U.S. Cl. ..... 312/237; 165/138; 219/10.55 E

[57] ABSTRACT

A refrigerated appliance having a cabinet defining a pair of cavities and an apparatus for refrigerating one of the cavities. The refrigerated cavity is provided with doors for selectively closing the refrigerated cavity. The other of the cavities defines an opening and is adapted to receive a freestanding microwave oven having an integral door. The open cavity may be provided with a trim for adapting the cavity to any one of a plurality of different microwave ovens electrically disposed therein. The trim may define a vent for providing the microwave oven with cooling air flow circulation. The refrigeration apparatus may define a freestanding cabinet with the microwave oven defining a freestanding oven carried on a horizontal support wall at the top of the refrigeration space.

18 Claims, 1 Sheet Drawing,

12 Pages Specification

The file of this unexamined application may be inspected and copies thereof may be purchased (849 O.G. 1221, Apr. 9, 1968).

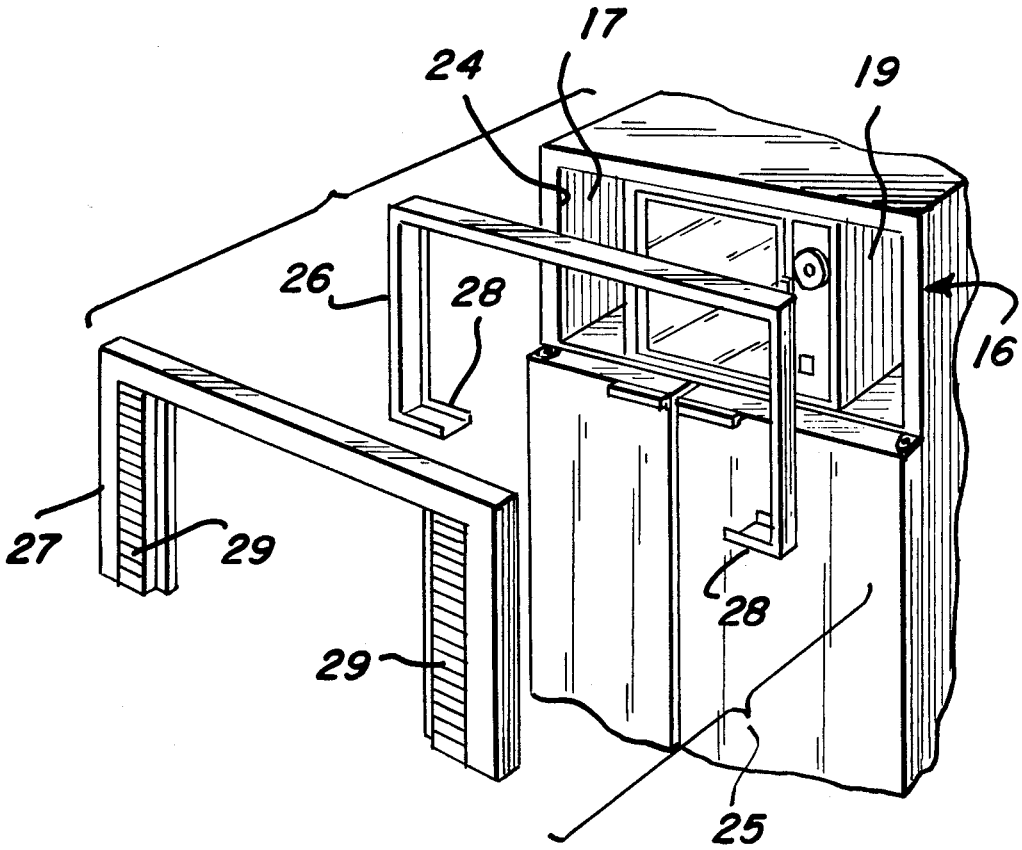

FIG. 1
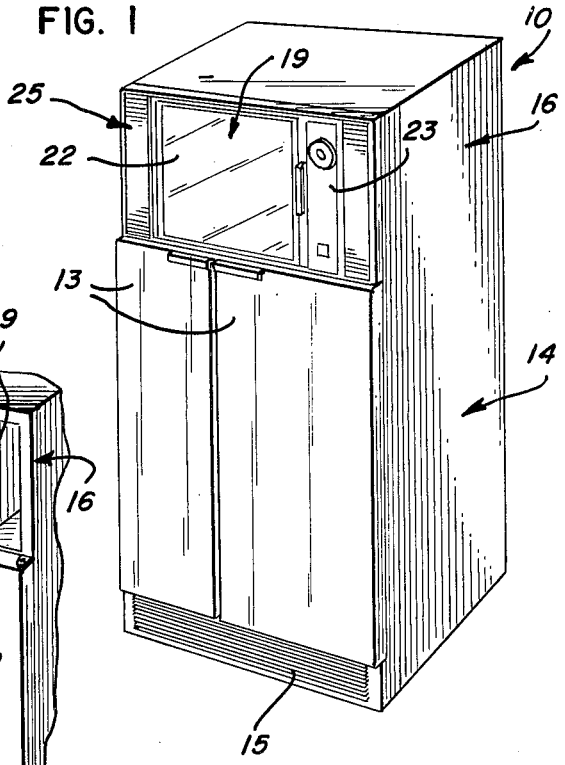
FIG. 2
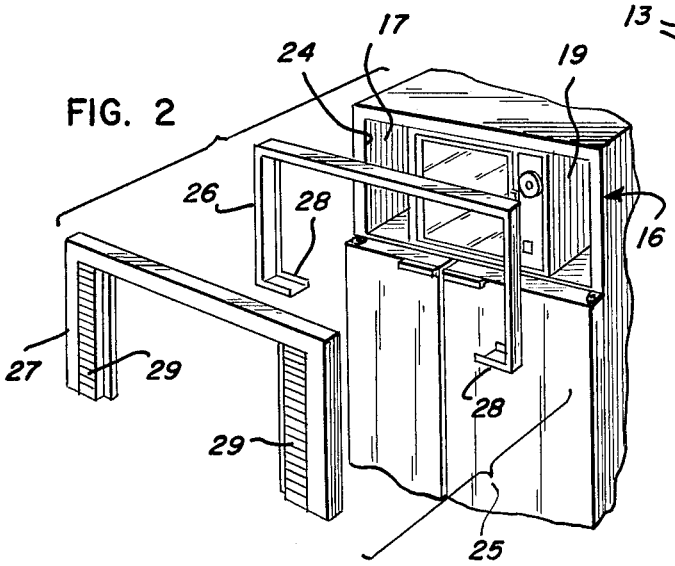
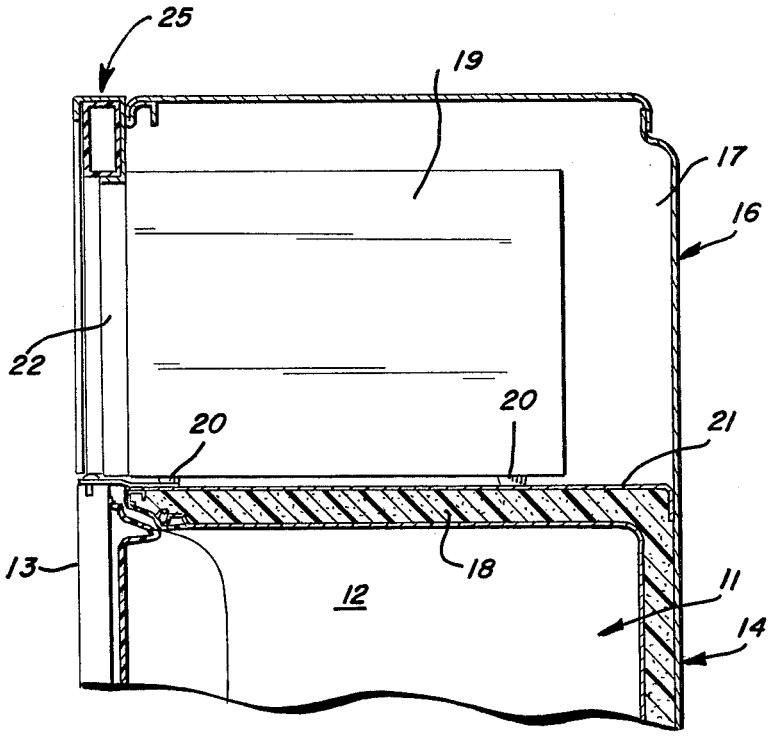
FIG. 3